Patented Aug. 26, 1941

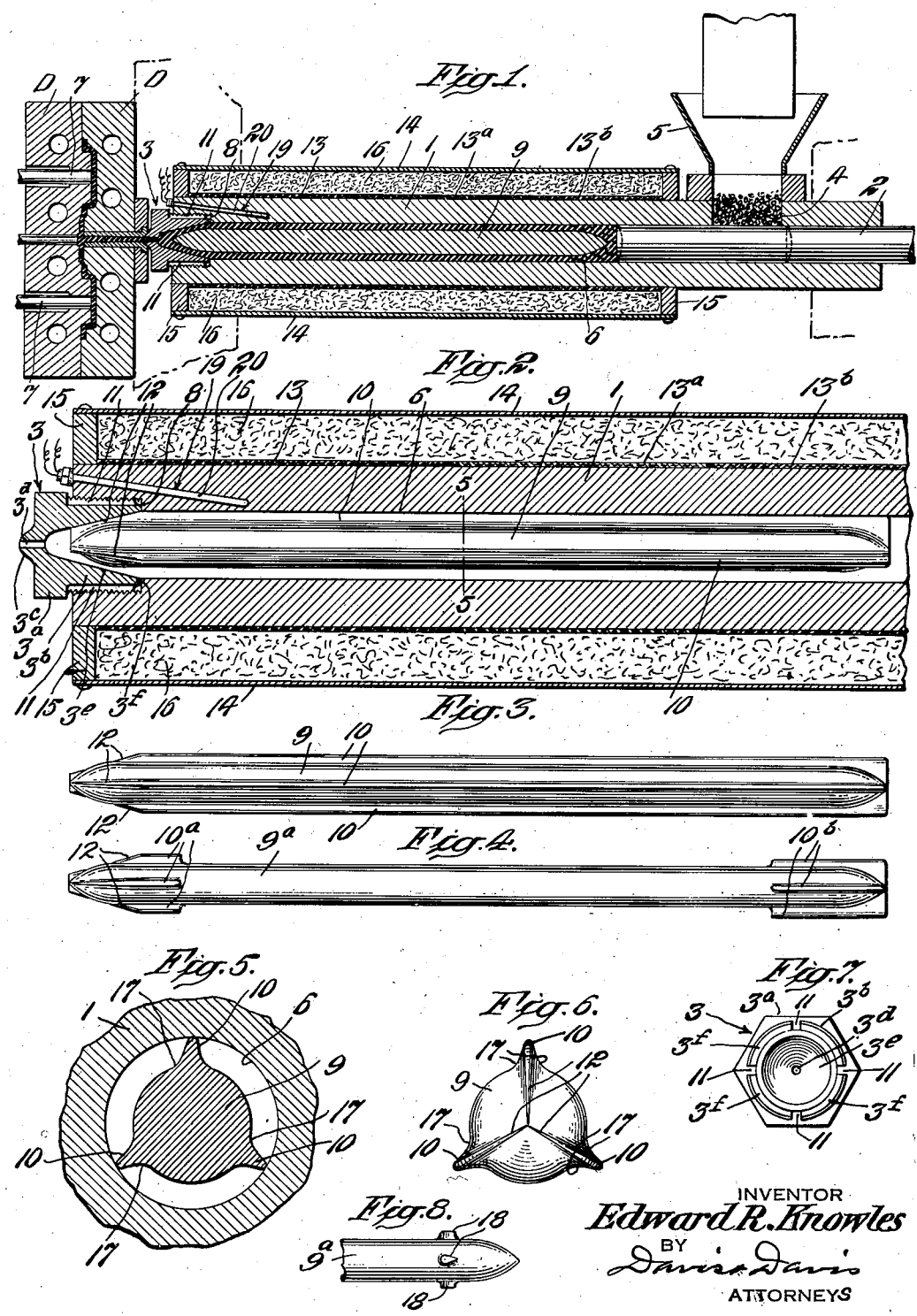

2,253,627

UNITED STATES PATENT OFFICE 2,253,627

INJECTION MOLDING DEVICE

Edward R. Knowles, Bridgeport, Conn., assignor to The Watson-Stillman Co., Roselle, N. J., a corporation of New Jersey Application April 2, 1938, Serial No. 199,569

3 Claims. (Cl. 18—30)

This invention relates to improvements in an injection device for charging a mold with a thermoplastic material.

Important objects of the invention are, to provide such an injection device designed to perform its work with maximum efficiency; to make provision in such a device for improved distribution of heat through a charge of the moldable material in order to quickly bring the entire charge to a required plastic condition, increase the rate of injection and assist materially in obtaining a molded product of good quality; to provide for accurate control of the degree of heat supplied to the charge; and to provide such a device with improved features of design and assembly.

Other objects of the invention will appear hereinafter.

In the drawing, Fig. 1 is a longitudinal sectional view of the injection device showing it in delivery connection with a mold and with the injection plunger advanced to the limit of the injection stroke;

Fig. 2 is a longitudinal sectional view of the device upon a larger scale than Fig. 1 and with the rear portion of the device broken away;

Fig. 3 is a side view of the torpedo;

Fig. 4 is a side view of the torpedo showing a modification thereof;

Fig. 5 is an enlarged cross section on the line 5—5 of Fig. 2;

Fig. 6 is an end view of the torpedo on the same scale as Fig. 5;

Fig. 7 is a rear end view of the injection nozzle; and

Fig. 8 is a side view of an end portion of the torpedo showing a further modification.

It is well known in the art of injection molding of a thermoplastic material, such as a cellulose acetate, for example, that the provision of a satisfactory injection device has been attended by serious difficulties. In an elementary form such a device consists of an injection cylinder having a transverse charging orifice, a plunger to advance the charge in the cylinder, an injection nozzle at the forward end of the cylinder, and heating means surrounding the cylinder to heat the charge therein to a plastic state. A serious fault in that form of device is that in heating the entire charge sufficiently the outer portion of the charge, near the cylinder wall, becomes overheated and causes flaws in the molded product. In order to overcome this difficulty there has been employed a spreader for the charge in the form of a core mounted centrally within the injection cylinder or a heated extension thereof. It becomes heated to a certain extent by conduction through its mounting in the injection passage and its constrains the charge to pass between it and the heated cylinder wall. Because of its shape such a spreader is commonly called a "torpedo." Heretofore its employment has been attended by several difficulties including failure to heat sufficiently, the necessity for expansion of the cylinder bore or the provision of an extension upon the cylinder to accommodate it, the difficulty of mounting it for sufficient heat conduction without objectionable restriction of the injection passage, and difficulty of removal and replacement. The present injector is devised to eliminate these faults as well as others, as will appear hereinafter.

The injection device includes an elongated injection or heating cylinder 1, horizontally supported, an injection plunger 2 fitted to reciprocate in the rear length portion of the cylinder, and an injection nozzle 3 at the forward end of the cylinder. At its upper side the cylinder has a charging port 4 located directly in advance of the rearmost position of the plunger. A hopper 5 is mounted over said port to deliver the moldable material in a granular or powdered form through said port to the bore 6 of the cylinder. The nozzle 3 is adapted to discharge into a mold defined by a pair of abutting water-cooled dies D. Knockout pins 7 project through one of said dies to eject the molded products when the dies are opened. The means for supporting the dies and for opening and closing the mold, and the means for reciprocating the plunger are omitted from the illustration as they form no part of the present invention.

The bore 6 of the cylinder is long and of uniform diameter from the rear end of the cylinder to a point near the forward end. There it has a counterbore 8 threaded for attachment of the nozzle. Within the bore 6 there is a metal torpedo 9 of improved design. It comprises an elongated body of cylindrical form throughout most of its length and having streamlined ends tapering to a point. The body is integrally formed with thin radial fins 10 for supporting it centered within the bore. In the form shown in Figs. 1, 2 and 3 there are three fins equally spaced around the body and extending the entire length of the torpedo. Preferably the difference between the uniform diameter of the torpedo and that of the bore 6 does not exceed one-half of an inch and the depth of the fins is sufficient to hold the body centered within the bore by engagement with the wall of the latter. In combination with the wall of the bore the cylindrical body of the torpedo defines a long, annular or tubular injection passage whose thickness preferably does not exceed one quarter of an inch. The torpedo extends from a point slightly in advance of the forward limit of stroke of the plunger to approximately the forward end of the cylinder. There it abuts the interior of the nozzle, as will be explained hereinafter. Preferably the length of the torpedo is several times the total stroke length of the plunger 2. Two and one-half times the stroke length has been found to be a satisfactory length for the torpedo. The length of the cylindrical portion of the torpedo is preferably at least twice the said stroke length.

The nozzle 3 has a head 3ª and a shank 3ᵇ externally threaded to screw into the counterbore 8. The head is formed with a rounded nipple 3ᶜ to fit into the entrance of the mold gate and having a restricted injection port 3ᵈ. Said port leads from a conoidal cavity 3ᵉ formed in the rear end of the nozzle and flaring to the rear end of the nozzle where it is of the same diameter as the bore 6 and merges with it. At its forward end said cavity is rounded where it meets the injection port. The rear end of the nozzle has an annular rib or bead 3ᶠ immediately surrounding the mouth of cavity 3ᵉ, of less diameter than the following threaded portion of the nozzle, and of less diameter than the bottom of the counterbore 8. Said threaded portion is formed with a plurality of longitudinal grooves or flutes 11 equally spaced therearound and extending the length thereof. These grooves interrupt the thread and are of greater depth than the thread.

The head of the nozzle is polygonal to receive a wrench, and the nozzle is screwed into the counterbore 8 until the bead 3ᶠ bottoms therein. There is then an annular space around the bead, at the bottom of the counterbore and opening into the rear ends of the grooves. This space and the grooves provide a vent for any material which may be forced past the abutment bead by the injection thrust and prevent clogging of the screw threads and consequent difficult removal of the nozzle. Furthermore the interrupted thread acts like a tap when the nozzle is unscrewed and cuts out any of the material which may have lodged in the thread of the counterbore.

Forward displacement of the torpedo by the injection thrust is resisted by the nozzle 3. The tapering wall of the nozzle recess 3ᵉ forms an abutment for the forward end of the torpedo. The torpedo fins 10 extend clear to the forward end of the torpedo and their outer edges there converge correspondingly to the taper of said recess wall, as at 12. All of the fins make abutting contact of material length with said wall to positively resist the injection thrust upon the torpedo. Between the fin abutments there is space for the material to pass the forward end of the torpedo and reach the injection port.

Heating means surround the injection cylinder from a point adjacent to the charging port 4 to a point near the forward end of the cylinder. In the present instance there are three annular electrical heating units 13, 13ª and 13ᵇ. For a one and one-half inch cylinder bore I have found it satisfactory to have a forward unit 13 of eight hundred wattage and the units 13ª and 13ᵇ each of six hundred wattage. The heating units are surrounded by a jacket formed by a cylindrical shell 14 and annular end members 15 mounted upon the exterior of the cylinder and supporting said shell. The jacket space between the shell and the heating units is filled with asbestos packing 16.

Fig. 4 shows a slightly modified form of the torpedo. Here the body 9ª of the torpedo is similar to that previously described but is provided with supporting fins only at its end portions. These fins, designated 10ª and 10ᵇ, are exactly like the end portions of the fins 10 in form and arrangement. Omission of fins from most of the length of the torpedo reduces the resistance to flow of the material past the torpedo. At the same time the torpedo is adequately supported in centered position in the bore. In both forms the fins are merged with the body of the torpedo by curved surfaces 17 and taper toward their outer edges. Preferably their outer edges are rounded as shown. Sharp corners are avoided to reduce flow resistance and prevent lodging of the material.

Fig. 8 shows another modification of the torpedo. Pin-like projections 18 are here molded upon the rear end portion of the torpedo body, as substitutes for the pins 10ᵇ. These projections are streamlined, as indicated.

Provision is also made for more accurate control of the temperature in the bore 6. For that purpose the injection cylinder is provided with a slender bore 19 extending obliquely inward from the forward end of the cylinder to a point located between the surrounding heating unit 13 and the bore 6 and quite close to the latter. A thermocouple 20 is fitted in the bore 19 and has connection with the usual means, not shown, for controlling the supply of current to the heating means. Heretofore it has been customary to locate the thermocouple directly at the heating means, quite removed from the injection bore. By locating the thermocouple close to the bore the heat control means is rendered more responsive to the temperature requirements within the bore.

In the operation of the injection device advance of the plunger 2 from the dotted line position in Fig. 1 to the full line position forces a charge of the moldable material into the restricted passage between the torpedo body and the wall of the bore 6. Several charges are forced along said passage before mold-charging is commenced, in order to give the cylinder and the torpedo time to heat up sufficiently. The torpedo is heated mainly by transference of heat through the stream of material. The stream is long and thin, preferably not exceeding one-quarter of an inch in radial thickness. Therefore the material in the passage has a maximum area of contact with the heated wall of the bore 6 and also with the torpedo. Heat transference to the torpedo is thereby assisted and is accelerated as the material becomes plastic and its conductivity increases. An approximate equality of temperature between the wall of the bore and the slender torpedo is thus obtained to render the material uniformly plastic. The injection speed can then be increased with consequent increase in molding capacity and also with ensurance of complete charging of the mold. High injection speed is most desirable in order to prevent hardening of the material in the chilled mold before the mold cavities are completely filled.

The design of the injection device also facilitates cleaning and other servicing. Removal of the nozzle 3 by unscrewing frees the torpedo for withdrawal through the forward end of the bore. The completely streamlined torpedo, the uniform bore 6 and the nozzle 3 can then be easily cleaned. The bore contains no transverse abutments for the torpedo and no corners for lodgment of material. Consequently there is no danger of lodged material becoming charred, working out into the injection stream and causing flaws in the molded product.

It will be seen that the injection device has been designed to render the thermoplastic material uniformly plastic at a rapid rate, ensure more flawless molding, increase the rate of injection and molding and facilitate servicing. It will also be seen that these advantages are obtained without structural complications. The device is extremely simple and comparatively inexpensive to manufacture.

What I claim is:

1. An injection device for charging a mold, comprising a body with an injection bore and an internally screw-threaded counterbore at the forward end thereof, and an injection nozzle having a shank externally screw-threaded and screw-engaged in said counterbore, characterized in that the nozzle shank has an annular end abutment rib to abut the bottom of the counterbore and of an external diameter to afford an annular space therearound in the counterbore, and the threaded shank of the nozzle has a plurality of longitudinal grooves therealong opening into said annular space, for the purpose set forth.

2. An injection device for charging a mold, comprising a body with an injection bore and an internally screw threaded counterbore at the forward end of said injection bore, and an injection nozzle having a shank externally screw-threaded and screw-engaged in said counterbore, characterized in that the screw-threaded connection between the nozzle shank and the counterbore is longitudinally fluted, for the purpose set forth.

3. An injection device for charging a mold with thermoplastic material, comprising an injection cylinder, an injection nozzle at the forward end of said cylinder, an injection plunger reciprocable in the cylinder, a torpedo within the cylinder and between said plunger and nozzle, and means for heating the cylinder, characterized in that the bore of the cylinder containing the plunger and torpedo is elongated and of uniform diameter, the torpedo is formed arranged and supported to define, in combination with said bore, an injection passage around and along the torpedo and in delivery communication with the nozzle and of a length along the bore materially exceeding the length of the plunger stroke, said bore is counterbored at its forward end, the injection nozzle has a shank to fit in said counterbore and abut the bottom thereof, there is a screw-threaded connection between the nozzle shank and the counterbore, said screw-threaded connection is fluted longitudinally of the nozzle, for the purpose set forth, and the nozzle forms an abutment for the forward end of the torpedo to resist endwise injection thrust upon the latter.

EDWARD R. KNOWLES.